(12) United States Patent
Hara et al.

(10) Patent No.: US 6,570,352 B2
(45) Date of Patent: May 27, 2003

(54) CONTROL UNIT FOR ELECTRIC POWER STEERING APPARATUS

(75) Inventors: Takeshi Hara, Gunma (JP); Tohru Sakaguchi, Gunma (JP); Shuji Endo, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/987,759

(22) Filed: Nov. 15, 2001

(65) Prior Publication Data

US 2002/0060538 A1 May 23, 2002

(30) Foreign Application Priority Data

Nov. 17, 2000 (JP) .................................. 2000-350457
Nov. 17, 2000 (JP) .................................. 2000-350458

(51) Int. Cl.$^7$ ................................................ H02P 7/00
(52) U.S. Cl. ........................ 318/432; 318/437; 180/6.2; 180/6.28
(58) Field of Search ................................ 318/432, 437; 180/6.2, 6.28

(56) References Cited

U.S. PATENT DOCUMENTS 5,040,629 A * 8/1991 Matsuoka et al. ............ 180/446
5,719,766 A * 2/1998 Bolourchi et al. ............. 701/42
5,881,836 A * 3/1999 Nishimoto et al. .......... 180/446
5,982,137 A * 11/1999 Endo ............................. 180/412

FOREIGN PATENT DOCUMENTS

| JP | 9-277950 | 10/1997 | ............ B02D/6/00 |
| JP | 10-109655 | 4/1998 | ............ B62D/5/04 |
| JP | 11-34901 | 2/1999 | ............ B62D/6/00 |
| JP | 2002-002516 | 1/2002 | |

* cited by examiner

*Primary Examiner*—Rita Leykin
(74) *Attorney, Agent, or Firm*—Sughrue Mion, PLLC

(57) ABSTRACT

Provides a control unit for an electric power steering apparatus with improved steering performance by recognizing a turn and a return of a steering wheel in a steering wheel return control, and by employing information on a steering angular velocity in calculating a current. This control unit controls a motor for giving steering assist force to a steering mechanism based on a current control value calculated from a steering assist command value calculated based on the steering torque generated in the steering shaft, and a current value of the motor. A steering wheel return controller for applying a steering wheel return control signal to the steering assist command value is provided, thereby to execute the steering wheel return control only when the steering wheel returns.

9 Claims, 14 Drawing Sheets

CONTROL UNIT FOR ELECTRIC POWER STEERING APPARATUS

BACKGROUND OF THE INVENTION

1. Field of the Invention

The present invention relates to a control unit for an electric power steering apparatus that provides steering assist force by a motor to a steering system of an automobile or a vehicle. The present invention particularly relates to a control unit for an electric power steering apparatus of which steering performance has been improved by arranging such that a steering return control recognizes a turn and a return of a steering wheel and information on a steering speed is used for calculating a current for controlling the return of the steering wheel.

2. Description of the Related Art

An electric power steering apparatus that applies assist load to the steering apparatus of an automobile or a vehicle with turning effort of a motor applies the driving force of the motor to a steering shaft or a rack axis based on a transmission mechanism like gears or belts via a reduction gear. Such a conventional electric power steering apparatus carries out a feedback control of a motor current for accurately generating an assist torque (a steering assist torque). The feedback control is for adjusting a motor application voltage so as to minimize a difference between a current control value and a motor current detection value. The motor application voltage is generally adjusted based on a duty ratio of a PWM (pulse width modulation) control.

A general structure of the electric power steering apparatus will be explained below with reference to FIG. 1. A shaft 2 of a steering wheel 1 is connected to a tie rod 6 of running wheels through reduction gears 3, universal joints 4a and 4b and a pinion rack mechanism 5. The shaft 2 is provided with a steering angle sensor 7 for detecting a steering angle of the steering wheel 1, and a torque sensor 10 for detecting a steering torque. A motor 20 for assisting the steering force of the steering wheel 1 is connected to the shaft 2 through the reduction gears 3. A control unit 30 for controlling the power steering apparatus is supplied with power from a battery 14 through an ignition key 11. The control unit 30 calculates a steering assist command value I of an assist command based on a steering torque T detected by the torque sensor 10, a vehicle speed V detected by a vehicle speed sensor 12, and a steering angle θ detected by the steering angle sensor 7. The control unit 30 then controls a current to be supplied to the motor 20 based on the calculated steering assist command value I.

The control unit 30 is mainly composed of a CPU. FIG. 2 shows general functions to be executed based on a program inside the CPU.

Functions and operation of the control unit 30 will be explained below. A steering torque T detected by the torque sensor 10 and then inputted is phase-compensated by a phase compensator 31 for increasing the stability of the steering system. The phase-compensated steering torque TA is inputted to a steering assist command value calculator 32. A vehicle speed V detected by the vehicle speed sensor 12 is also inputted to the steering assist command value calculator 32. The steering assist command value calculator 32 calculates a steering assist command value I as a control target value of a current to be supplied to the motor 20, based on the inputted steering torque TA and the inputted vehicle speed V. The steering assist command value I is inputted to a subtractor 30A, and is also inputted to a differential compensator 34 of a feedforward system for increasing a response speed. A difference (I−i) calculated by the subtractor 30A is inputted to a proportional calculator 35, and is also inputted to an integration calculator 36 for improving the characteristic of a feedback system. Outputs from the differential compensator 34 and the integration calculator 36 are inputted to and added together by an adder 30B. A result of the addition by the adder 30B is obtained as a current control value E, and this is inputted to a motor driving circuit 37 as a motor driving signal. A motor current value "i" of the motor 20 is detected by a motor current detecting circuit 38, and this motor current value "i" is inputted to the subtractor 30A and is fed back.

In this case, when a driver operates the steering wheel to make a vehicle pass a curve, the steering apparatus receives force to return to a neutral point, that is, a straight-line running position, based on reactive force of the tires received from the surface of the road. Accordingly, when the driver hands off the steering wheel at the time when the car has finished passing the curve, the steering apparatus naturally returns to the neutral point based on the reactive force received from the surface of the road. As a result, the steering wheel turns to the opposite direction. This operation is generally called a "return of the steering wheel".

In general, the steering wheel of a vehicle tries to return to a neutral point based on the reactive force of the suspension called a self-aligning torque (SAT). However, in the case of the electric power steering apparatus, the rotation of the motor 20 for assist assistance is transmitted to the steering mechanism via the reduction gears 3. Therefore, there is a problem that the return of the steering wheel 1 becomes insufficient, particularly during a running at a low speed, due to the inertia moment of the motor 20 and the influence of friction of the reduction gears 3. Consequently, it is necessary to control the motor 20 to return the steering wheel 1 to a neutral point.

According to this steering wheel return control, in general, a return current that works in the steering wheel return direction is determined based on the steering angle θ that is detected by the steering angle sensor 7, without making a distinction between the time of turning and the time of returning the steering wheel. However, as this current works in a direction opposite to the direction of turning the steering wheel, as a matter of fact, the driver has always felt an excessive friction and a strange touch like a spring at the time of turning the steering wheel.

Further, according to the conventional method of controlling the current for returning the steering wheel, the current is determined based on only the steering angle and the vehicle speed, without taking into account the steering angular velocity. Therefore, this gives a bad influence to the astringency of the steering wheel, at the time when the steering wheel is returned at a high steering angular velocity. Further, according to techniques disclosed in Japanese Patent Application Laid-open No. 9-277950 A and Japanese Patent Application Laid-open No. 11-34901 A, the steering wheel return control and the astringency control are switched over between them according to the vehicle speed and the steering angular velocity. However, according to the above method, there occurs time when the astringency control is not carried out during the astringent operation, and this has a risk of not exhibiting the effect of the astringency control, and giving a sense of incongruity to the driver when the controls are switched over between them.

SUMMARY OF THE INVENTION

The present invention has been made in the light of the above situations. It is an object of the present invention to provide a control unit for an electric power steering apparatus capable of improving the steering performance while taking balance between the steering wheel return control and the astringency control, by recognizing the turn and the return of the steering wheel in the steering wheel return control, and by employing the information on the steering angular velocity in the calculation of the current for the steering wheel return control.

The present invention provides a control unit for an electric power steering apparatus that controls a motor for giving steering assist force to a steering mechanism based on a current control value calculated from a steering assist command value calculated based on the steering torque generated in the steering shaft, and a current value of the motor. The object of the present invention can be achieved based on the provision of a steering wheel return controller for applying a steering wheel return control signal to the steering assist command value, thereby to execute the steering wheel return control only when the steering wheel returns.

Further, the present invention provides a control unit for an electric power steering apparatus that controls a motor for giving steering assist force to a steering mechanism, and controls the steering wheel to a neutral point by using a steering angle sensor, based on a current control value calculated from a steering assist command value calculated based on the steering torque generated in the steering shaft and a current value of the motor. The object of the present invention can be achieved based on the provision of a steering wheel return controller for applying a steering wheel return control signal to the steering assist command value, thereby to always execute the steering wheel return control and the astringency control.

DESCRIPTION OF THE PREFERRED EMBODIMENTS

Figure 1:
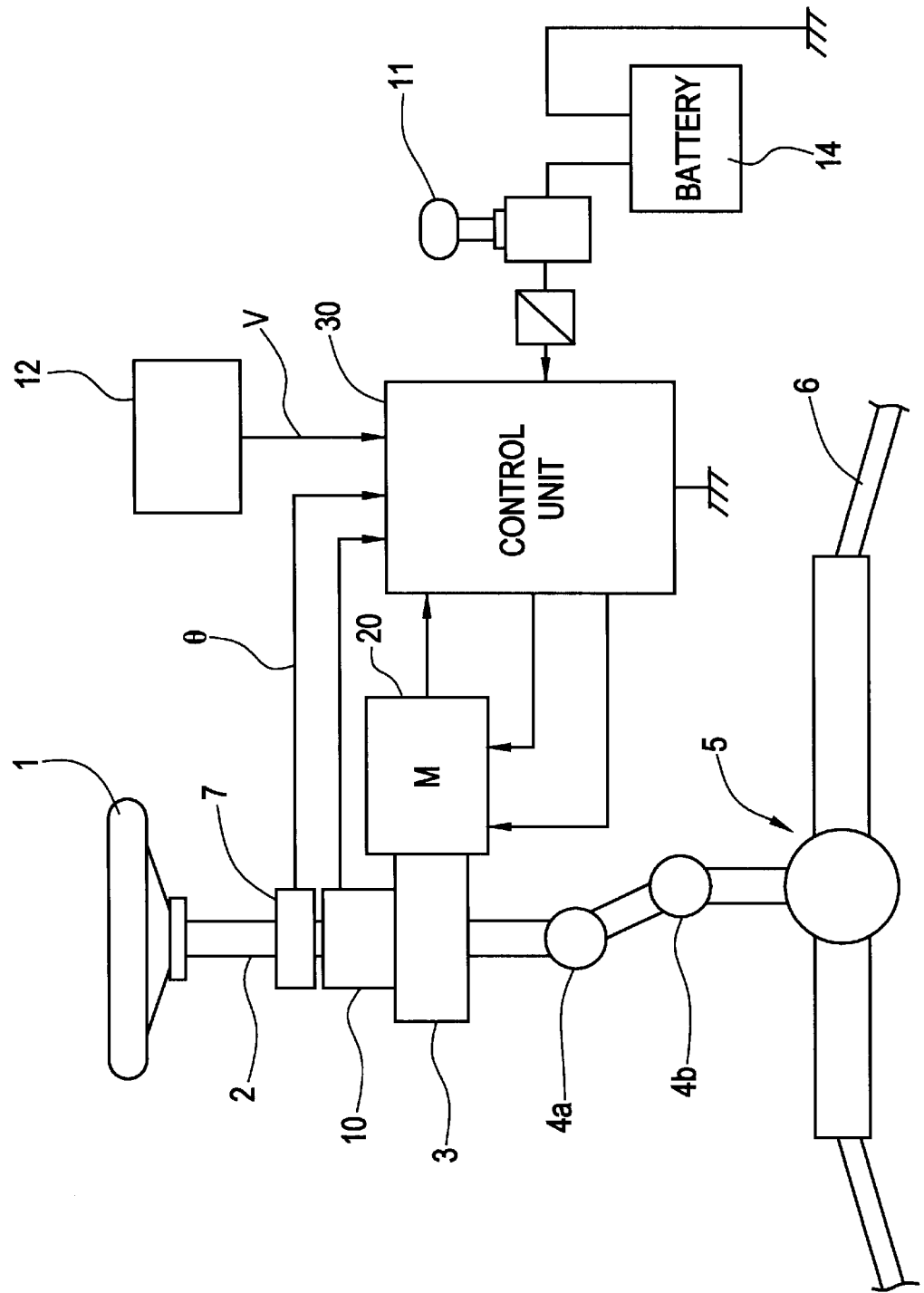
FIG. 1 is a diagram showing a general example of an electric power steering mechanism.
Figure 2:
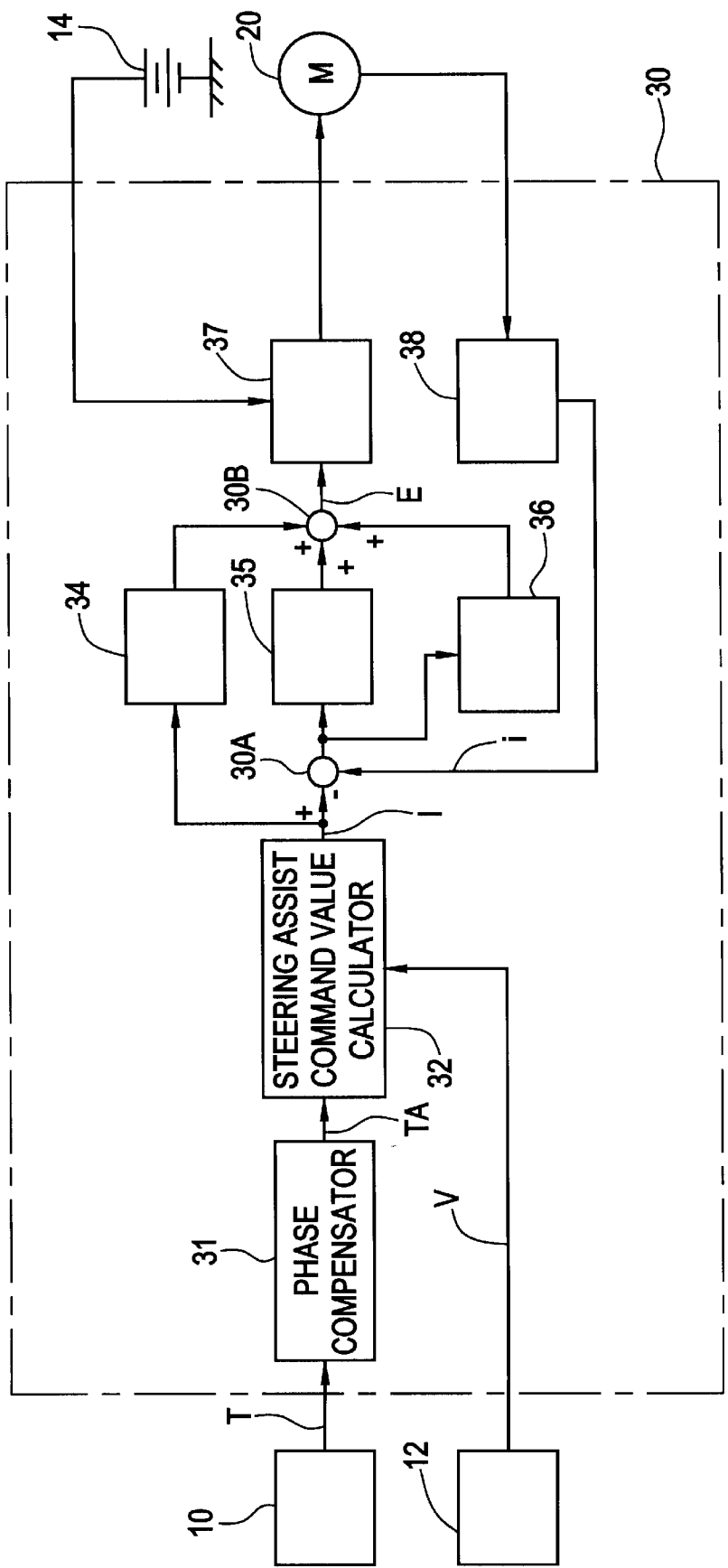
FIG. 2 is a block diagram showing an example of a general internal structure of a control unit.

According to the present invention, a direction of a steering angle from a steering angle sensor is compared with a direction of a steering angular velocity, thereby to discriminate between the turn and the return of the steering wheel. Specifically, the steering angle and the steering angular velocity are set such that, for example, when they are in the right-turn direction, they are positive, and when they are in the left-turn direction, they are negative, with a neutral point as a boundary. When the signs of both the steering angle and the steering angular velocity are the same, a decision is made that the steering wheel has been turned. When the signs of both the steering angle and the steering angular velocity are different, a decision is made that the steering wheel has been returned. The steering angular velocity may be determined based on not only the steering angle sensor, but also a value calculated from a change (a differential) of a steering angle, or an angular velocity estimate value of a motor as disclosed in Japanese Patent Application Laid-open No. 10-109655 A. The steering wheel return control is executed only when the rotation of the steering wheel is stopped or when the steering wheel returns, by using the discrimination of the turn and return of the steering wheel. With this arrangement, it is possible to prevent the interference of the steering assistance due to the steering wheel return control, when the steering wheel returns.

Further, according to the conventional method of controlling the current for returning the steering wheel, the current is determined based on only the steering angle and the vehicle speed, without taking into account the steering angular velocity. Therefore, this gives a bad influence to the astringency of the steering wheel, at the time when the steering wheel is returned at a high steering angular velocity. However, according to the present invention, a return current gain due to a steering angular velocity is adjusted, thereby to realize the steering wheel return control for securely returning the steering wheel to a neutral point while eliminating the bad influence to the astringency.

Still further, according to conventional improved techniques (disclosed, for example, in Japanese Patent Application Laid-open No. 9-277950 A and Japanese Patent Application Laid-open No. 11-34901 A), the steering wheel return control and the astringency control are switched over between them according to the vehicle speed and the steering angular velocity. However, according to this method, there occurs time when the astringency control is not carried out during the astringent operation, and this has a risk of not exhibiting the effect of the astringency control, and giving a sense of incongruity to the driver when the steering wheel return control and the astringency control are switched over between them. However, according to the present invention, the astringency control is carried out all the time, and the return control is also carried out all the time. Therefore, by taking balance between the return control and the astringency control based on the adjustment of the return control according to the steering angular velocity, it is possible to take advantage of both controls in all areas. As a result, it is possible to obtain a satisfactory steering feeling.

Embodiments of the present invention will be explained below with reference to the drawings.

Figure 3:
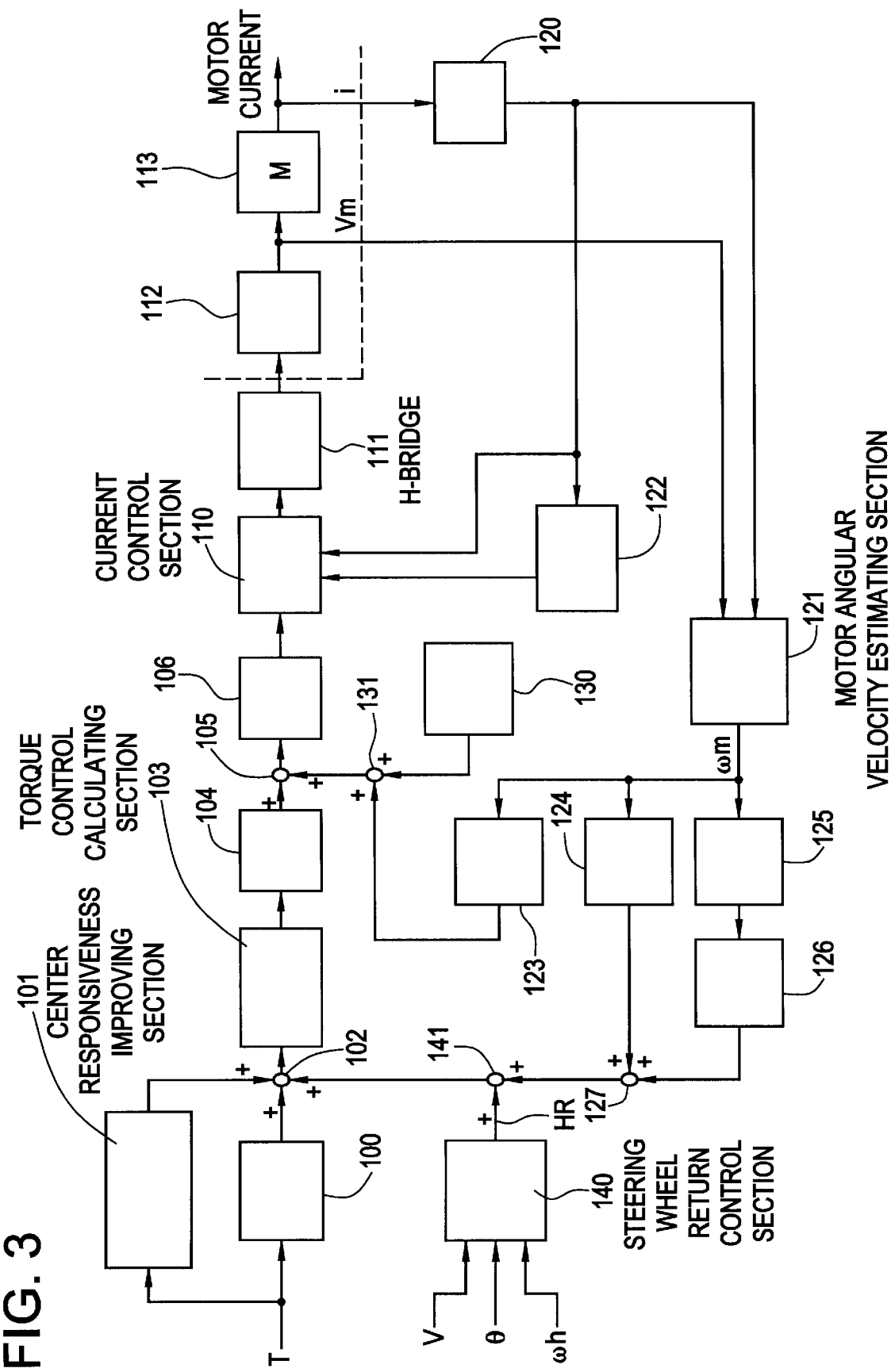
FIG. 3 is a block diagram showing an example of a structure of an electric power steering apparatus according to the present invention.

FIG. 3 is a block diagram of control functions in the present embodiment. A steering torque T from a torque sensor is inputted to a steering assist command value calculating section 100 and a center responsiveness improving section 101. Outputs from these sections are inputted to an adder 102. A result of the addition by the adder 102 is inputted to a torque control calculating section 103. The center responsiveness improving section 101 secures stability and compensates for static friction in an assist characteristic insensitive area. An output signal from the torque control calculating section 103 is inputted to a motor loss current compensating section 104. An output signal of the motor loss current compensating section 104 is inputted to a maximum current limiting section 106 via an adder 105. A maximum current value is limited by the maximum current limiting section 106, and this is inputted to a current control section 110. The motor loss current compensating section 104 adds a current that does not appear in a motor output when a motor current flows, thereby to improve a rise from a motor output torque "0". The maximum current limiting section 106 controls a current command value such that a maximum current command value becomes a rated current. An output of the current control section 110 is inputted to a current driving circuit 112 via an H-bridge characteristic compensating section 111. Based on this, the current driving circuit 112 drives a motor 113.

A motor current "i" of the motor 113 is inputted to a motor angular velocity estimating section 121, a current drive switching section 122 and the current control section 110 via a motor current offset correcting section 120. A motor terminal voltage Vm is inputted to the motor angular velocity estimating section 121. An angular velocity $\omega_m$ estimated by the motor angular velocity estimating section 121 is inputted to a motor angular velocity estimating section/inertia compensating section 123, a motor loss torque compensating section 124 and a yaw rate estimating section 125. An output of the yaw rate estimating section 125 is inputted to an astringency control section 126. Outputs from the astringency control section 126 and the motor loss torque compensating section 124 are inputted to an adder 127, and are added together by the adder 127. A result of the addition is inputted to the adder 102. The motor angular velocity estimating section/inertia compensating section 123 eliminates a torque that accelerates or decelerates the motor inertia from the steering torque, and changes the steering torque to provide a steering feeling having no sense of inertia. The astringency control section 126 applies braking to the shaking of the steering wheel, in order to improve the yaw astringency of the vehicle. The motor loss torque compensating section 124 assists a torque corresponding to a loss torque of the motor 113, in a direction in which the loss torque of the motor 113 occurs, that is, in the rotation direction of the motor 113. Further, a current dither signal generating section 130 is provided. Outputs from the current dither signal generating section 130 and the motor angular velocity estimating section/inertia compensating section 123 are added by an adder 131. A result of this addition is inputted to the adder 105. The current dither signal generating section 130 prevents the motor from being adhered by static friction.

An adder 141 is applied with a steering wheel return control signal HR from a steering wheel return control section 140. The steering wheel return control section 140 is inputted with a vehicle speed V from the vehicle speed sensor, a steering angle θ from the steering angle sensor and a steering angular velocity $\omega_h$. The steering angular velocity $\omega_h$ may be determined based on a differential value obtained by differentiating the steering angle θ from the steering angle sensor, or a motor angular velocity $\omega_m$ that has been estimated by the motor angular velocity estimating section 121, or a value obtained from a steering angular velocity sensor that is provided additionally.

Figure 4:
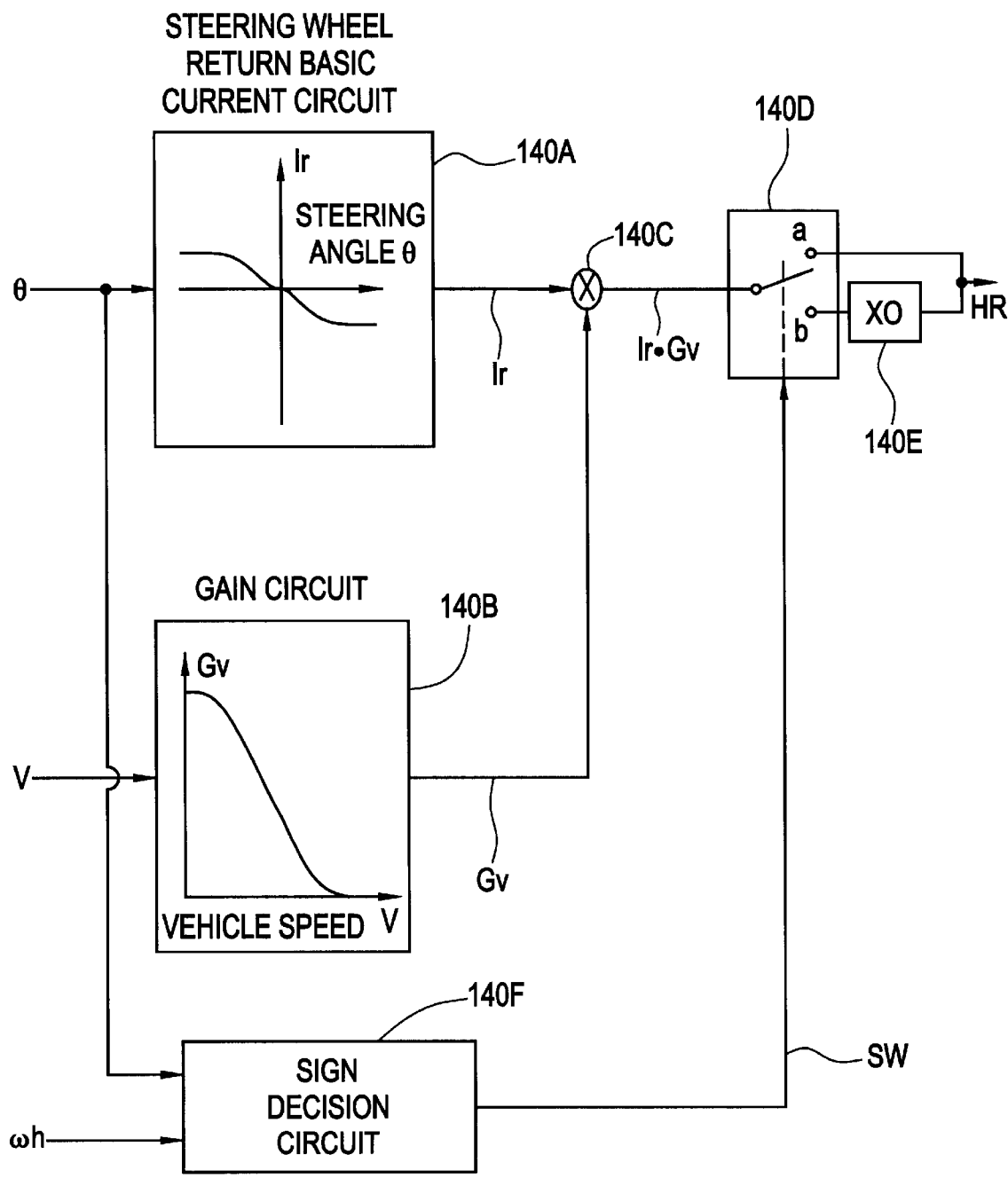
FIG. 4 is a block diagram showing an example of a structure of a steering wheel-return controller (the first embodiment)

FIG. 4 shows an example of a structure of the steering wheel return control section 140 (the first embodiment). The steering wheel return control section 140 is composed of a steering wheel return basic current circuit 140A that outputs a steering wheel return basic current value Ir using a predetermined function based on a steering angle θ, a gain circuit 140B that inputs a vehicle speed V and outputs a gain Gv corresponding to a vehicle speed V using a predetermined function, a multiplier 140C that multiplies a steering wheel return basic current value Ir from the steering wheel return basic current circuit 140A with the gain Gv from the gain circuit 140B, a switch 140D that outputs an output Ir·Gv from the multiplier 140C to a contact point "a" or "b" based on a switching between these contact points, a sign decision circuit 140F that inputs the steering angle θ and a steering angular velocity $\omega_h$, and decides whether the signs of these inputs coincide with each other or not, and a zero output circuit 140E that sets zero to the output when the contact point "a" of the switch 140D has been switched to the contact point "b".

The sign decision circuit 140F outputs a switch signal SW as a decision signal, and switches over between the contact points of the switch 140D. When the sign of the steering angle θ and the sign of the steering angular velocity $\omega_h$ do not coincide with each other, the contact point is switched over to the contact point "a" with the switch signal SW. When the sign of the steering angle θ and the sign of the steering angular velocity $\omega_h$ coincide with each other, the contact point is switched over to the contact point "b" with the switch signal SW. Further, the contact points "a" and "b" of the switch 140D can also be switched over between them from a circuit (not shown) that detects that the steering angular velocity $\omega_h$ has become zero.

Figure 5:
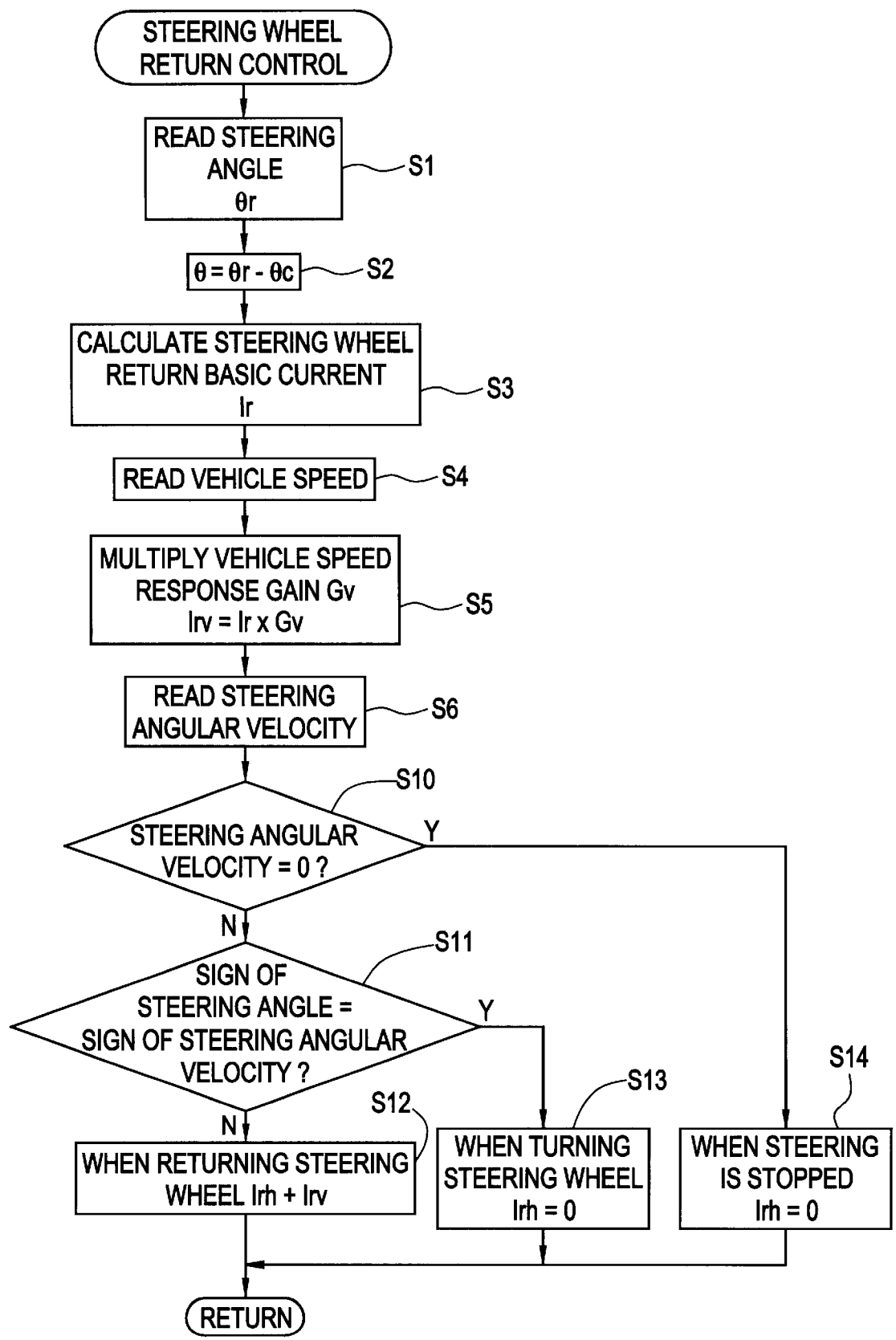
FIG. 5 is a flowchart showing an example of the operation of the steering wheel-return controller (the first embodiment)

FIG. 5 shows an example of the operation of the steering wheel return control section 140. First, the steering wheel return control section 140 reads a steering angle θ from the steering angle sensor (Step S1), and obtains a steering angle θ based on a neutral point θc (Step S2). The steering angle θ can be obtained as "θ=θr−θc", where θr is a read value. Then, the steering wheel return basic current circuit 140A obtains a steering wheel return basic current value Ir from the steering angle θ (Step S3). Next, the steering wheel return basic current circuit 140A reads a vehicle speed V (Step S4), and the multiplier 140C multiplies a vehicle speed response gain Gv outputted from the gain circuit 140B with the steering wheel return basic current value Ir (Step S5). Namely, Ir·Gv are obtained.

Next, a steering angular velocity $\omega_h$ is read (Step S6). The steering angular velocity $\omega_h$ may be determined based on a differential value obtained by differentiating the steering angle θ from the steering angle sensor, or a motor angular velocity $\omega_m$ that has been estimated by the motor angular velocity estimating section 121, or an output value obtained from a steering angular velocity sensor. The sign decision circuit 140F decides whether the steering angular velocity $\omega_h$ is zero or not (Step S10). When the steering angular velocity $\omega_h$ is zero, a decision is made that the move of the steering wheel is in a stop status, and the contact point of the switch 140D is set to the contact point "b". With this arrangement, the output of the steering wheel return control section 140D, that is, the steering wheel return control signal HR, is set to zero (Step S14).

Further, when the steering angular velocity $\omega_h$ is not zero at the Step S10, the sign decision circuit 140F decides whether the sign of the steering angle is the same as the sign of the steering angular velocity or not (Step S11). When the sign of the steering angle is the same as the sign of the steering angular velocity, the sign decision circuit 140F decides that the steering wheel is in the turn status. Thus, sign decision circuit 140F switches the contact point of the switch 140D to the contact point "b" with the switch signal SW. With this arrangement, the steering wheel return control signal HR is set to zero (Step S13). When the sign of the steering angle is different from the sign of the steering angular velocity, the sign decision circuit 140F decides that the steering wheel is in the return status. Thus, the sign decision circuit 140F switches the contact point of the switch 140D to the contact point "a" with the switch signal SW. Then, an output (=Ir·Gv) from the multiplier 140C is outputted straight, and the steering wheel return control signal HR is set to "0".

Figure 6:
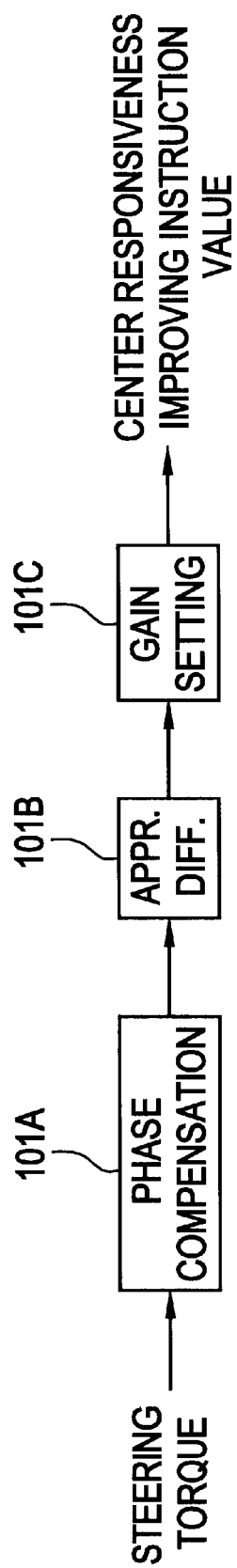
FIG. 6 is a block configuration diagram of a center response improving section.
Figure 7:
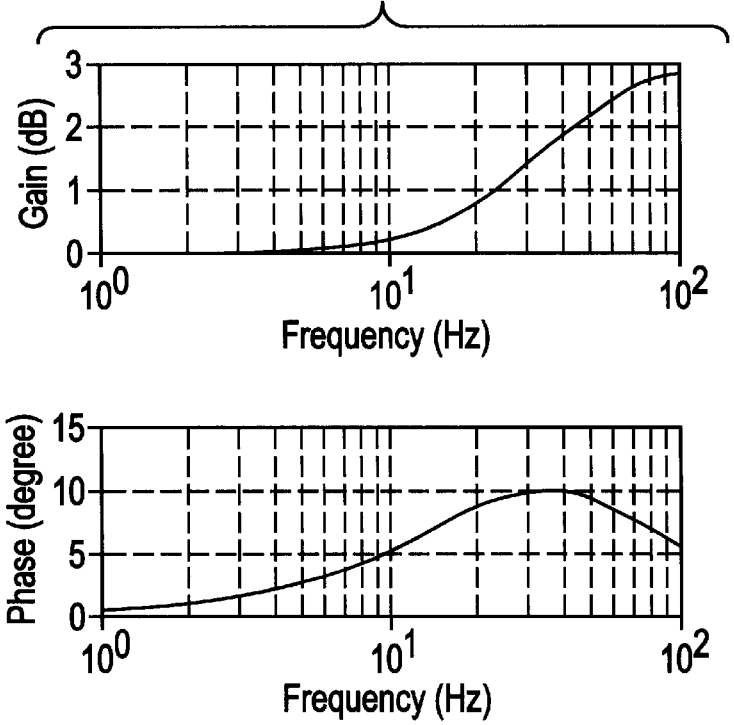
FIG. 7 is a diagram showing an example of characteristics of a phase compensator.
Figure 8:
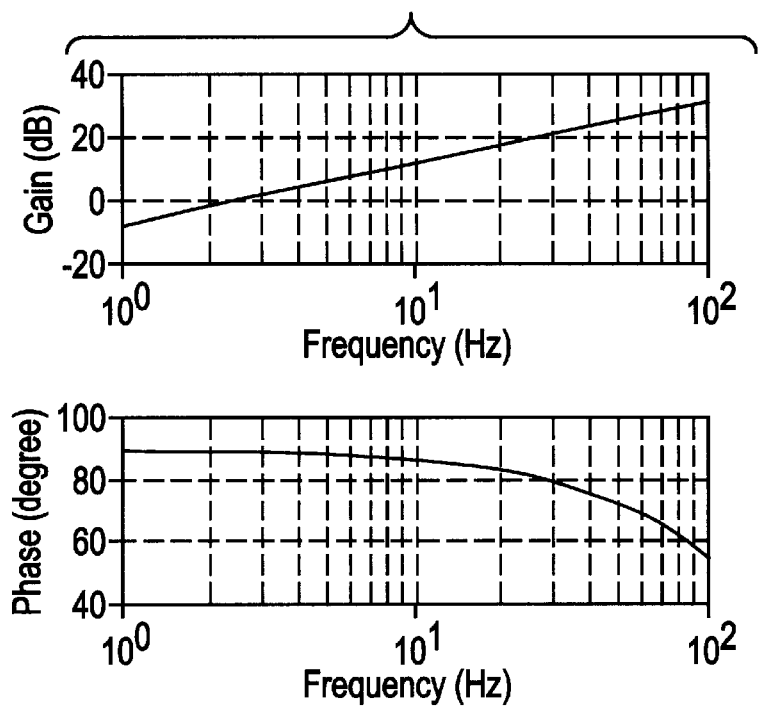
FIG. 8 is a diagram showing an example of characteristics of an approximate differentiator.
Figure 9:
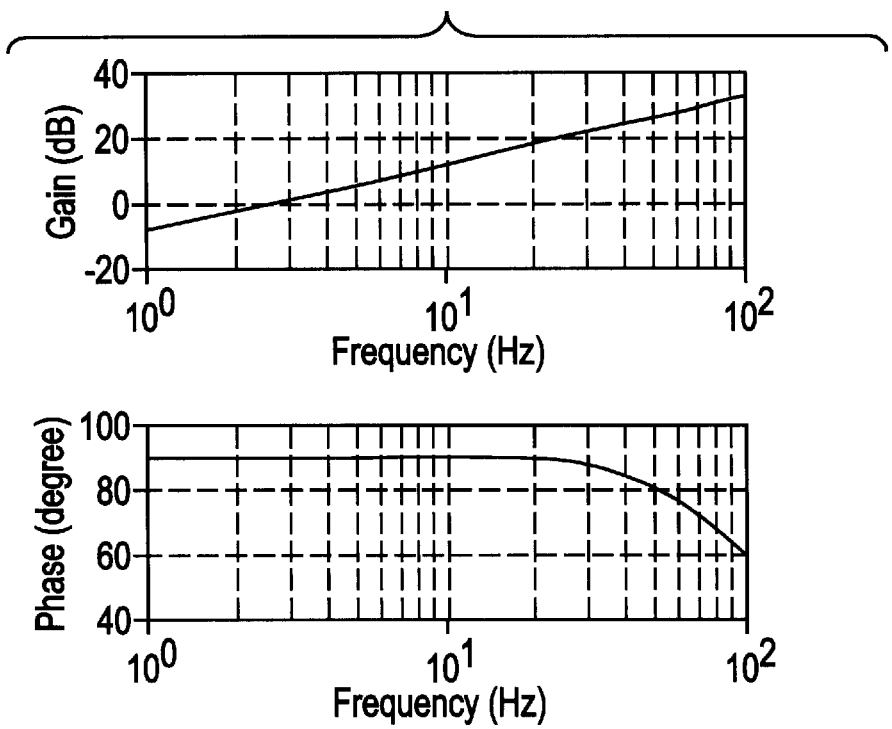
FIG. 9 is a diagram showing combined characteristics of the phase compensator and the approximate differentiator.

Next, a structure of other portions of FIG. 3 will be explained. According to the present invention, the center responsiveness improving section 101 comprises a phase compensating section 101A, an approximate differentiating section 101B and a gain setting section 101C as shown in FIG. 6. Further, the phase compensating section 101A has a frequency characteristic as shown in FIG. 7, and the approximate differentiating section 101B has a frequency characteristic as shown in FIG. 8. With this arrangement, combined characteristics of the phase compensation and the approximate compensation become as shown in FIG. 9. The gain setting section 101C sets the gain by switching the vehicle speed V and the steering torque T.

Further, in order to reduce the unstable steering feeling that the steering wheel is suddenly returned, and to stabilize the steering, the steering torque is increased, the steering torque change rate is increased, and the gain is decreased when the steering torque is in the decreasing direction. In other words, the switching conditions are set as follows. |steering torque|(=A) and |steering torque−steering torque (one sampling before)|(=B) are equal to or above respective predetermined values, and sign (A) < >sign (B). A vehicle speed range is divided into three, and the gain after the switching is in three different values in these ranges, for example. In the above, sign (A) < >sign (B) means that the signs of A (=steering torque) and B (=steering torque−steering torque (one sampling before)) are different.

Figure 10:
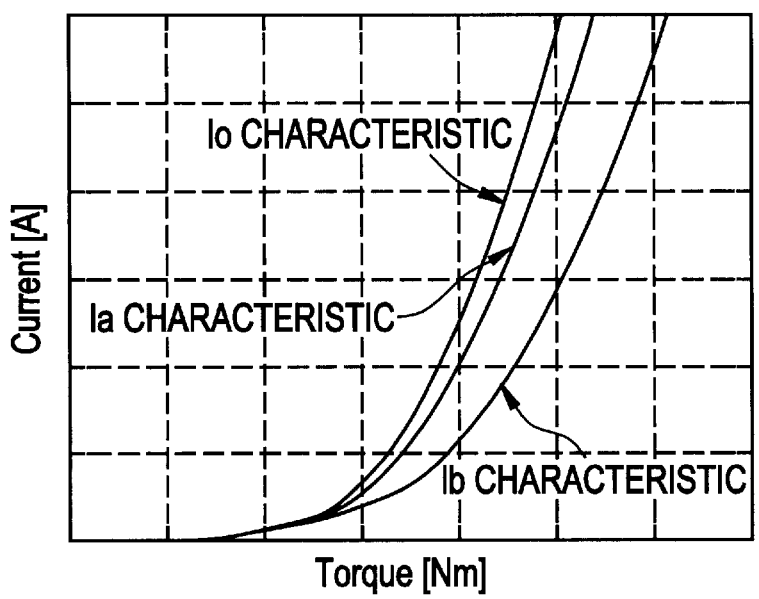
FIG. 10 is a diagram showing basic assist characteristics.
Figure 11:
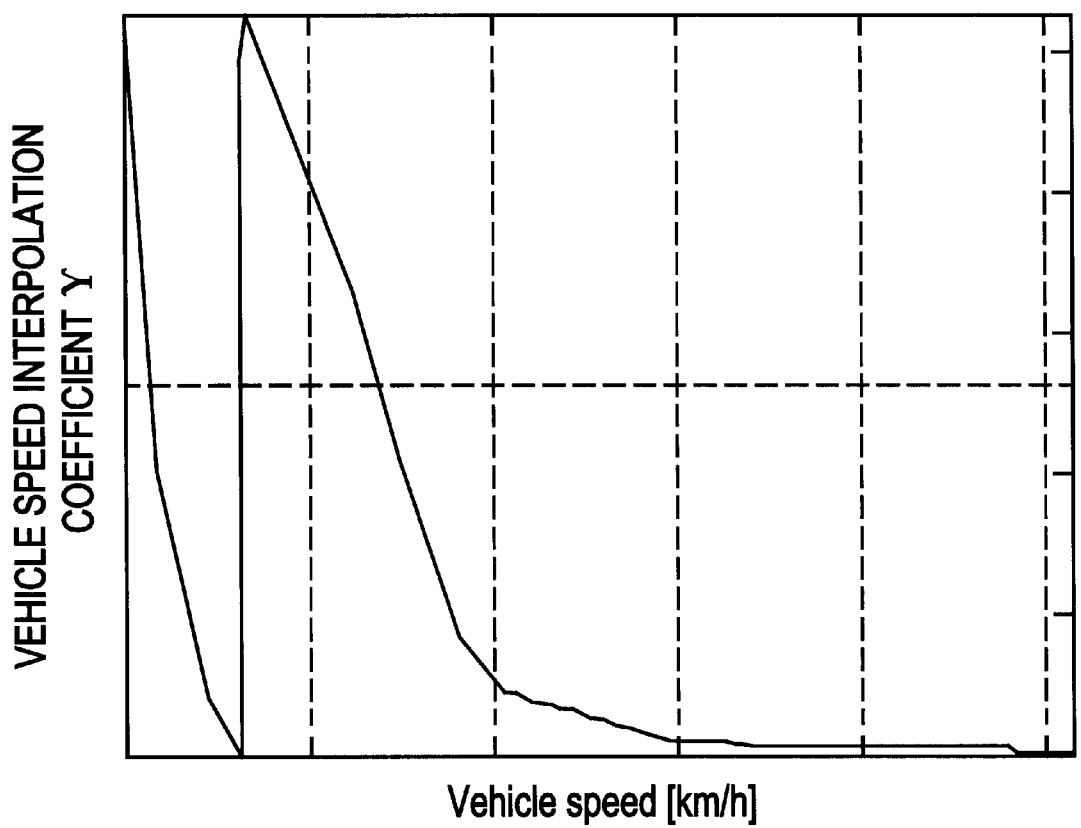
FIG. 11 is a diagram showing one example of a vehicle speed interpolation calculation.

Further, according to the present invention, the steering assist command value calculating section 100 sets the assist characteristic of three representative vehicle speeds (0, V1, V2 Km/h) as a basic characteristic in the calculation of the assist value. The steering assist command value calculating section 100 calculates the assist values at other speeds by interpolating between the basic characteristics for every 2 Km/h of the vehicle speed according to the vehicle interpolation gain. Then, the vehicle speed of the assist characteristic is set to a range from 0 to V2 Km/h, and the resolution is set as 2 Km/h. FIG. 10 shows the basic assist characteristics (torque versus current). The basic assist characteristics are expressed as 0 Km/h=1o characteristic, V1 Km/h=1a characteristic and V2 Km/h=1b characteristic. For other vehicle speeds, the assist current is calculated by interpolating between the vehicle speeds for every 2 Km/h using a vehicle speed (Km/h) versus vehicle speed interpolation coefficient γ shown in FIG. 11. When the vehicle speed is from 0 to V1 Km/h, the assist current I is I=1a(T)+γ(V)(1o(T)−1a(T)). When the vehicle speed is from (V1+2) to V2 Km/h, the assist current I is I=1b(T)+γ(V)(1a(T)−1b(T)).

Figure 12:
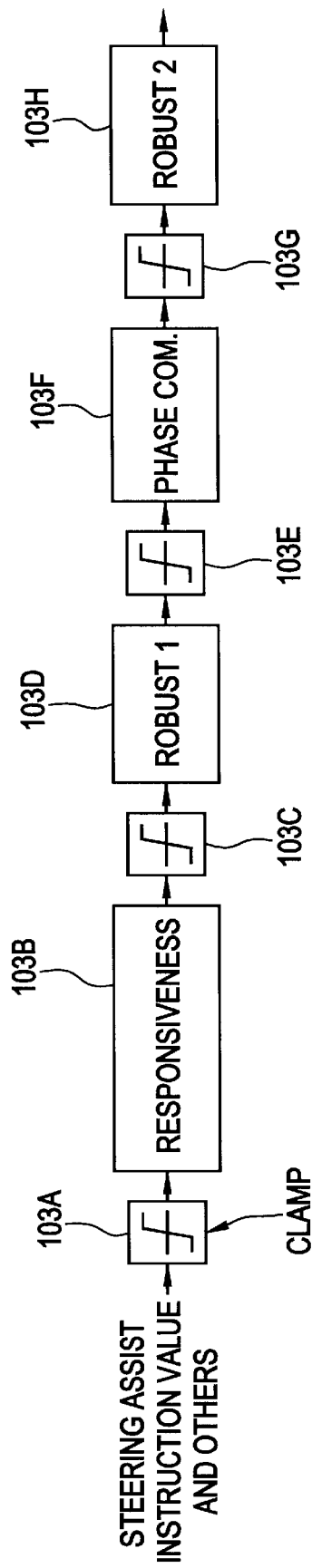
FIG. 12 is a block diagram showing an example of a structure of a torque control calculation.

Further, according to the present embodiment, the torque control calculating section 103 sets a steering torque response for stabilizing the mechanical system of the electric power steering apparatus, stabilizing the oscillation of the rubber damper at the reduction gears, and adjusting the steering feeling. FIG. 12 shows this structure. A responsiveness defining section 103B is provided at the rear stage of a clamp circuit 103A. At the rear stage of the responsiveness defining section 103B, a robust stabilization compensating section 103D is disposed via a clamp circuit 103C. At the rear stage of the robust stabilization compensating section 103D, a phase compensating section 103F is provided via a clamp circuit 103E. Further, a robust stabilization compensating section 103H is disposed via a clamp circuit 103G.

Figure 13:
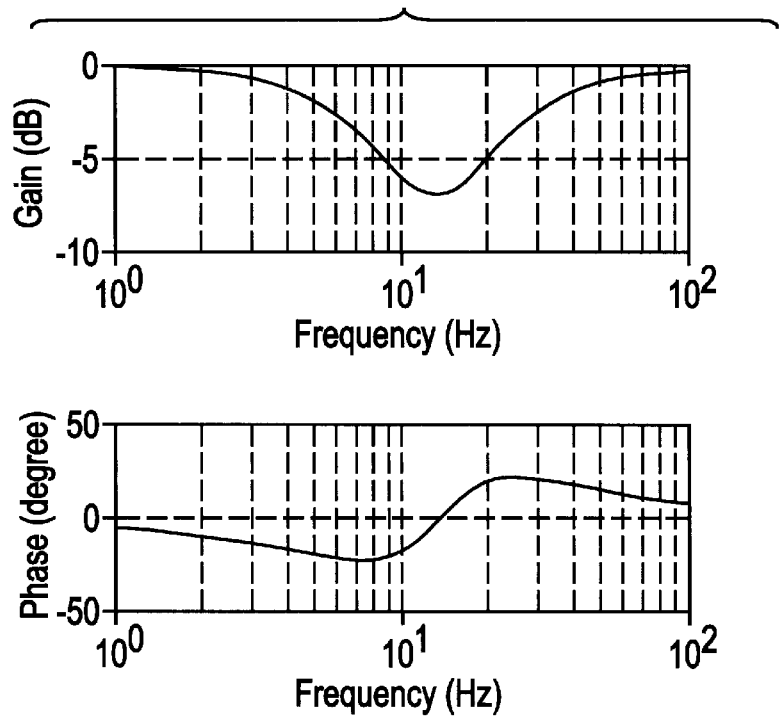
FIG. 13 is a diagram showing an example of characteristics of robust stabilization compensation.
Figure 14:
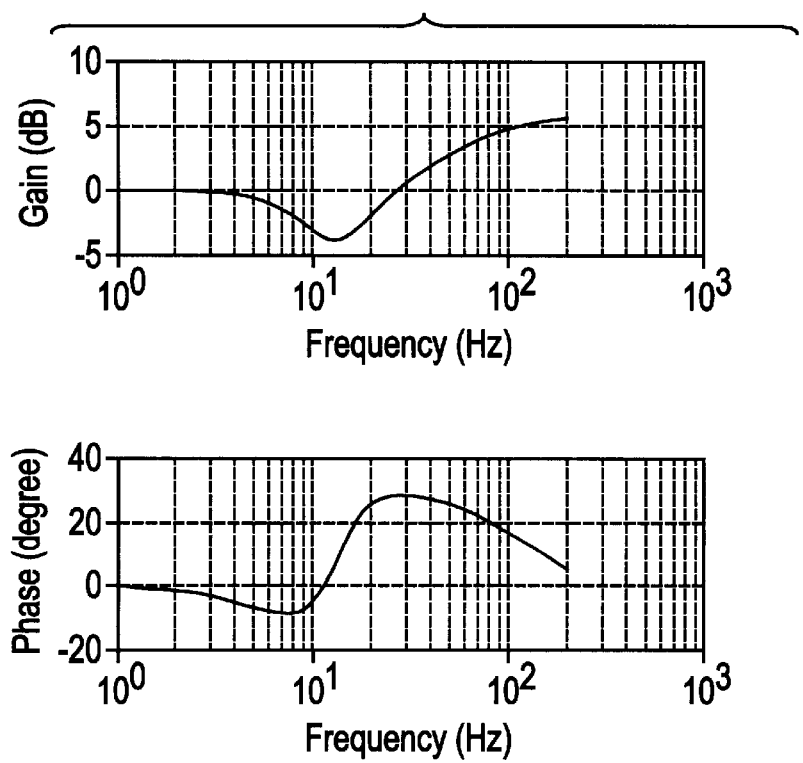
FIG. 14 is a diagram showing an example of characteristics of a mechanism system.
Figure 15:
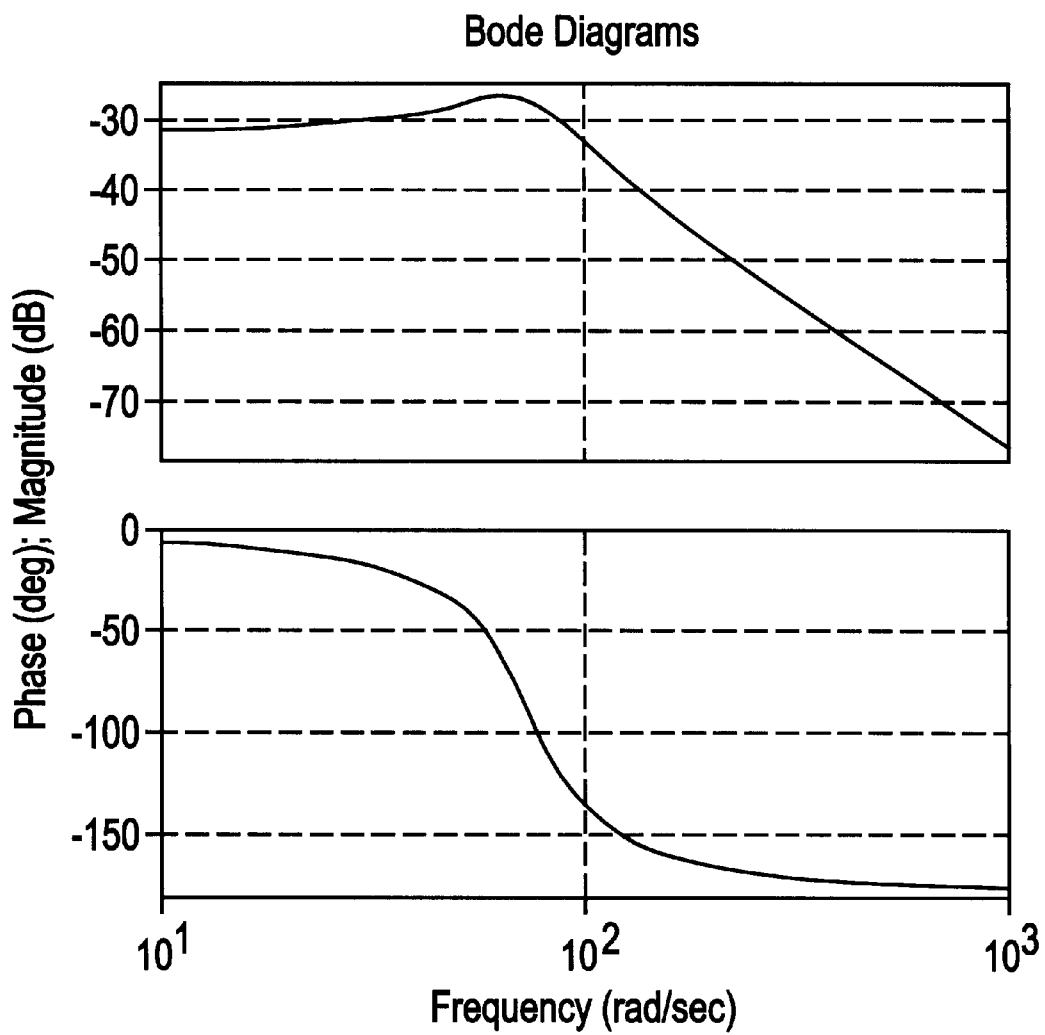
FIG. 15 a diagram showing an example of characteristics of a control system.

FIG. 13 shows characteristics of the robust stabilization compensating section 103H, and FIG. 14 shows characteristics of the total control system. FIG. 15 shows characteristics of the mechanical system. In total, the crest and trough are cancelled, and a substantially flat characteristic is obtained.

According to the electric power steering apparatus of the present invention, it is possible to discriminate between the turn and the return of the steering wheel, based on the comparison between the sign of the steering angle from the steering angle sensor and the sign of the steering angle velocity. By utilizing the above discrimination, the steering wheel return control is executed only when the steering wheel returns. Based on this arrangement, it is possible to remove the feeling of the friction and the sense of incongruity to the driver that have been inherent to the conventional steering wheel return control, while remaining the effect of reducing the load of the driver when returning the steering wheel.

Figure 16:
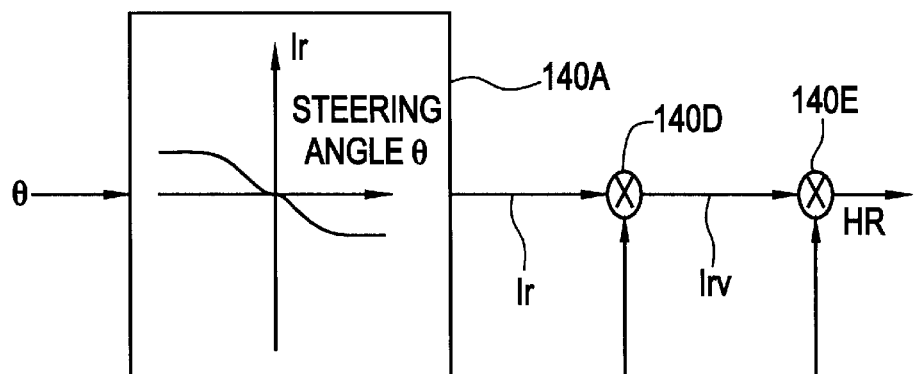
FIG. 16 is a block diagram showing an example of a structure of a steering wheel return controller (the second embodiment)
Figure 16:
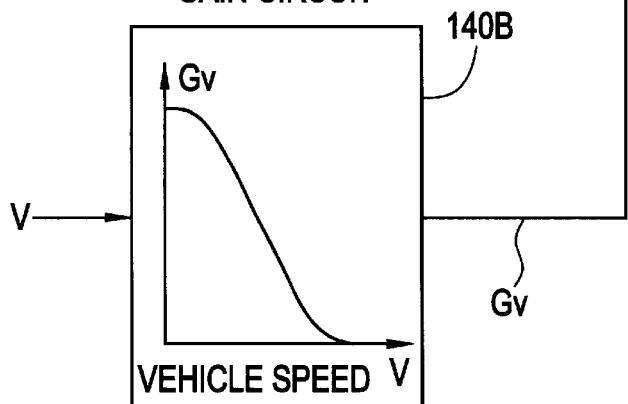
Figure 16:
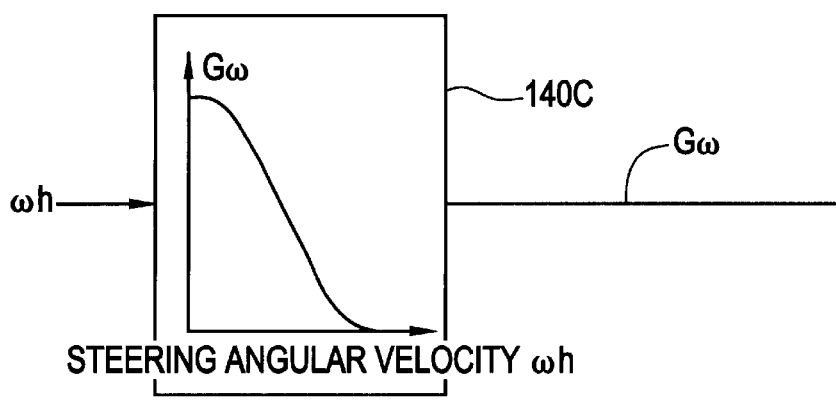

FIG. 16 shows an example of a structure of the steering wheel return control section 140(the second embodiment). The steering wheel return control section 140 is composed of a steering wheel return basic current circuit 140A that outputs a steering wheel return basic current value Ir using a predetermined function based on a steering angle θ, a gain circuit 140B that inputs a vehicle speed V and outputs a gain Gv corresponding to a vehicle speed V using a predetermined function, a gain circuit 140C that inputs a steering angular velocity $\omega_h$ and outputs a gain $G_\omega$ according to the steering angular velocity $\omega_h$ using a predetermined function, a multiplier 140D that multiplies the steering wheel return basic current value Ir from the steering wheel return basic current circuit 140A with the vehicle speed response gain Gv from the gain circuit 140B, and a multiplier 140E that multiplies an output Irv(=Ir·Gv) from the multiplier 140D with an output $G_{107}$ from the gain circuit 140C.

The control of astringency by the yaw rate estimating section 125 and the astringency control section 126 is executed based on the contents described in Japanese Patent Application Laid-open No. 2000-95132 A, for example. In other words, it is possible to securely converge the astringency of the yaw rate, by detecting a change rate of the yaw rate of the vehicle and giving a damping to the yaw rate based on the change rate.

Figure 17:
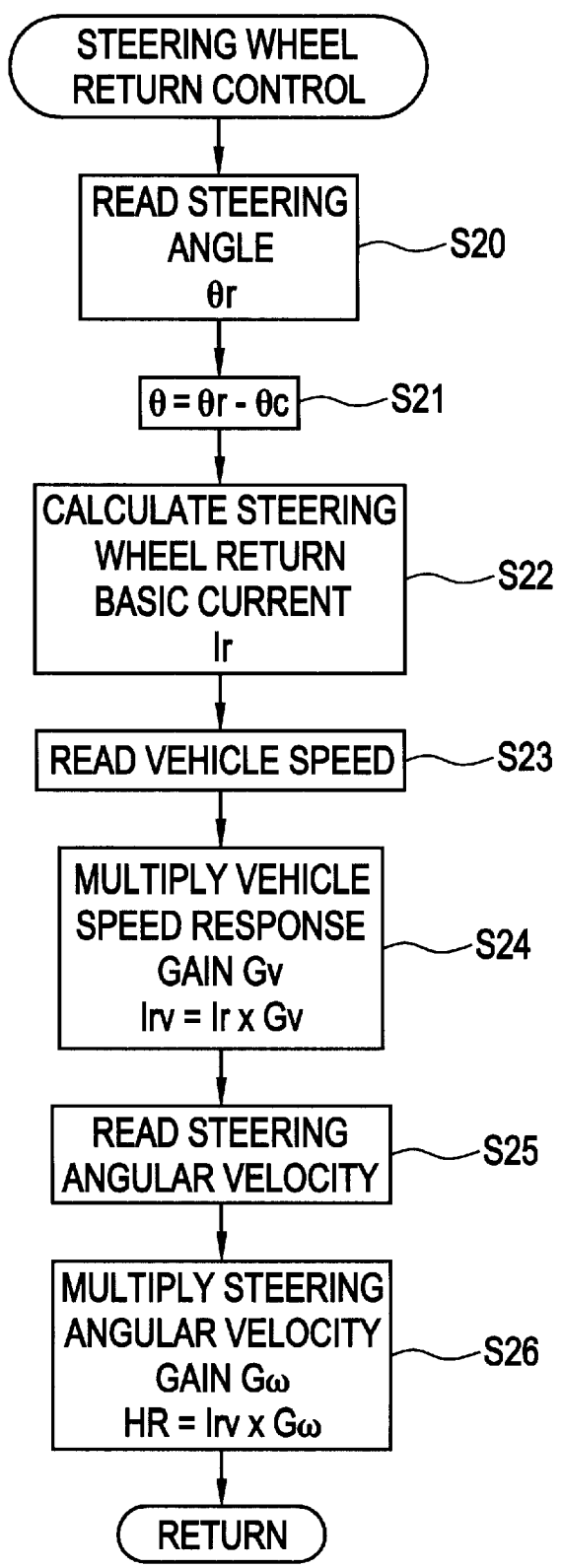
FIG. 17 is a flowchart showing an example of the operation of the steering wheel return controller (the second embodiment).

FIG. 17 shows an example of the operation of the steering wheel return control section 140. First, the steering wheel return control section 140 reads a steering angle θ from the steering angle sensor (Step S20), and obtains a steering angle θ based on a neutral point θc (Step S21). The steering angle θ can be obtained as "θ=θr−θc", where θr is a read value. Then, the steering wheel return basic current circuit 140A obtains a steering wheel return basic current value Ir from the steering angle θ (Step S22). Next, the steering wheel return basic current circuit 140A reads a vehicle speed V (Step S23), and the multiplier 140D multiplies a vehicle speed response gain Gv outputted from the gain circuit 140B with the steering wheel return basic current value Ir (Step S24). In other words, a result of the multiplication "Irv=Ir·Gv" is outputted.

Next, a steering angular velocity $\omega_h$ is read (Step S25). The steering angular velocity $\omega_h$ may be determined based on a differential value obtained by differentiating the steering angle θ from the steering angle sensor, or a motor angular velocity $\omega_m$ that has been estimated by the motor angular velocity estimating section 121, or an output value obtained from a steering angular velocity sensor. Based on the input of the steering angular velocity $\omega_h$, the gain circuit 140C outputs a $G_\omega$. Further, the multiplier 140E calculates Irv·$G_\omega$ (Step S26), and this is outputted as the steering wheel return control signal HR.

When the steering wheel return control signal HR generated above is applied to the steering assist command value obtained from the steering assist command value calculating section 100, it is possible to reduce a bad influence to the astringency control. Based on the reduction of the bad influence to the astringency, it is not necessary to provide time for stopping the control of the steering wheel return control. This method has a characteristic that a current does not change suddenly due to a change in the steering angular velocity, as compared with the switching system disclosed in Japanese Patent Application Laid-open No. 11-34901 A.

In the present embodiment, an output gain is adjusted according to an output steering angular velocity of the steering wheel return control, thereby restricting the return current when the steering angular velocity is high. Therefore, it is possible to reduce a bad influence applied from the steering wheel return current to the astringency. As a result, it is possible to execute both the steering wheel return control and the astringency control always in parallel. It is possible to satisfy both secure return of the steering wheel to a neutral point and quick astringency, without losing any one of these advantages.

What is claimed is:

1. A control unit for an electric power steering apparatus that controls a motor for giving steering assist force to a steering mechanism based on a current control value calculated from a steering assist command value calculated by calculating means based on the steering torque generated in the steering shaft, and a current value of the motor, the control unit for an electric power steering apparatus comprising a steering wheel return controller for applying a steering wheel return control signal to the steering assist command value, thereby to execute the steering wheel return control only when the steering wheel returns.

2. A control unit for an electric power steering apparatus according to claim 1, wherein the steering wheel return controller comprises: a steering wheel return basic current circuit that inputs a steering angle and outputs a steering wheel return basic current value; a gain circuit that inputs a vehicle speed and outputs a gain of a predetermined function; a sign decision circuit that inputs the steering angle and a steering angular velocity and decides whether the signs of these inputs coincide with each other or not; a multiplier that multiplies the steering wheel return basic current value with the gain; and a switching section that switches an output of the multiplier based on an output of the sign decision circuit.

3. A control unit for an electric power steering apparatus according to claim 2, wherein the switching section switches between a case where an output of the multiplier is directly outputted and a case where a zero is outputted.

4. A control unit for an electric power steering apparatus according to claim 2, the control unit comprising a steering angle sensor that detects the steering angle, and detects an absolute angle of the steering wheel.

5. A control unit for an electric power steering apparatus that controls a motor for giving steering assist force to a steering mechanism, and controls the steering wheel to a neutral point by using a steering angle sensor, based on a current control value calculated from a steering assist command value calculated by calculating means based on the steering torque generated in the steering shaft, and a current value of the motor, the control unit for an electric power steering apparatus comprising a steering wheel return controller for applying a steering wheel return control signal to the steering assist command value, thereby to always execute the steering wheel return control and the astringency control.

6. A control unit for an electric power steering apparatus according to claim 5, the control unit comprising a vehicle speed sensor, wherein the steering wheel return controller inputs a vehicle speed from the vehicle speed sensor and a steering angle from the steering angle sensor, and also inputs a steering angular velocity.

7. A control unit for an electric power steering apparatus according to claim 6, wherein the control unit converts the steering angle into a steering wheel return basic current value, converts the vehicle speed into a vehicle speed response gain, converts the steering angular velocity into a steering angular velocity response gain, and uses a multiplied value of the steering wheel return basic current value, the vehicle speed response gain, and the steering angular velocity response gain, as the steering wheel return control signal.

8. A control unit for an electric power steering apparatus according to claim 5, wherein the steering wheel return controller comprises: a steering wheel return basic current circuit that inputs a steering angle and outputs a steering wheel return basic current; a first gain circuit that inputs a vehicle speed and outputs a gain based on a first function; a second gain circuit that inputs a steering angular velocity and outputs a gain according to a second function; a first multiplier that multiplies the steering wheel return basic current with the gain according to the first function; and a second multiplier that multiplies an output of the first multiplier with the gain according to the second function.

9. A control unit for an electric power steering apparatus according to claim 8, the control unit comprising a steering angle sensor that detects the steering angle, and detects an absolute angle of the steering wheel.

* * * * *